United States Patent

[11] 3,592,416

| [72] | Inventor | Hans Richard Rikus<br>Ottobrunn, Germany |
|---|---|---|
| [21] | Appl. No. | 829,965 |
| [22] | Filed | June 3, 1969 |
| [45] | Patented | July 13, 1971 |
| [73] | Assignee | Entwicklungsring Sud GmbH<br>Munich, Germany |
| [32] | Priority | June 5, 1968 |
| [33] | | Germany |
| [31] | | P 17 56 548.9-22 |

[54] VERTICAL TAKEOFF AND LANDING AIRCRAFT
4 Claims, 2 Drawing Figs.

[52] U.S. Cl. .................................................. 244/54,
244/12 B
[51] Int. Cl. ...................................................... B64d 27/20,
B64c 29/04
[50] Field of Search .......................................... 244/53-
–55, 12, 23

[56] References Cited
UNITED STATES PATENTS

| 3,174,707 | 3/1965 | Ricard .......................... | 244/23 (X) |
| 3,223,360 | 12/1965 | Hertel et al. ................... | 244/54 (X) |
| 3,379,395 | 4/1968 | Smith .......................... | 244/23 |
| 3,388,878 | 6/1968 | Peterson et al. ............... | 244/23 |
| 3,429,527 | 2/1969 | Whittley ....................... | 244/55 (X) |
| 3,486,716 | 12/1969 | Haberkorn et al. ............ | 244/54 (X) |

*Primary Examiner*—Milton Buchler
*Assistant Examiner*—Jeffrey L. Forman
*Attorney*—William K. Serp ABSTRACT: A vertical takeoff and landing aircraft having a lift engine positioned within the fuselage adjacent the base of a wing, an intake duct connecting the intake of the engine with the dorsal surface of the fuselage and an exhaust duct connecting the outlet of the engine with the ventral surface of the wing proximate the base thereof. An air duct is included which passes from the upper surface to the ventral surface of the wing and which is in communication with the exhaust duct from the engine. Adjustable doors are provided for selectively obstructing the inlet and outlet orifices of the air duct, and a vane is positioned within the air duct so as to control the mixing of the gases passing from the engine and flowing through the air duct.

PATENTED JUL 13 1971　　3,592,416

VERTICAL TAKEOFF AND LANDING AIRCRAFT

BACKGROUND OF THE INVENTION

This invention generally relates to a vertical takeoff and landing (VTOL) aircraft with lift engines arranged within the fuselage in the vicinity of the wings and with intake ducts above and exhaust ducts below the wing plane.

Installation of the lift engines within the fuselage as opposed to installation exterior to the fuselage, for example at the wing tips, has the advantage that should one or more engines fail, dissymmetry about the roll axis will be minimized. Further, the arrangement of the intake duct and exhaust duct, as illustrated, effectively prevents gas recirculation.

A prior arrangement includes several lift engines arranged symmetrically about the center of gravity of the aircraft. The intake duct is positioned at the dorsal surface of the fuselage, and the exhaust duct is at the ventral surface. In order to increase thrust and, at the same time, minimize ground erosion and recirculation losses, modern VTOL aircraft frequently mix the cold air with the high-energy exhaust jet, thus bringing about a lift jet with relatively lower area loading and lower temperature. With such prior constructions, this requirement is attained with the introduction of serious design deficiencies. For example, secondary air must be drawn through a duct surrounding the engine and, additionally, from the fuselage dorsal surface. As a result of the large diameter of the engine, large ducts are required. The increased difficulty in mounting the engines is particularly disadvantageous. A further disadvantage experienced with such VTOL aircraft arrangements is that during the difficult vertical takeoff phase, there is a pressure buildup on the upper surfaces of the wings due to ram pressure and a negative pressure at the under surfaces of the wings. This accounts for a large part of the overall air resistance of the aircraft during the VTOL phase.

It is a main object of this invention to provide an aircraft which permits secondary air to be mixed with engine exhaust jet and also to assure pressure equalization between the upper and lower surfaces of the wing so as to afford relatively low air resistance. The illustrated embodiment achieves this objective by providing an air duct which passes through the wing at the base area. The air duct passes from the upper to the lower wing surface and is in communication with the exhaust duct of the engine. Secondary air is drawn through the air duct and into the primary gas stream. In this manner, the desired result of a more lightly loaded and cooler lift jet is achieved; and air is drawn out of the high-pressure area at the upper surfaces of the wings.

Another feature of the illustrated embodiment are doors which serve to selectively obstruct the air duct at the intake and outlet orifices thereof. The air duct can thus be closed during aerodynamic flight. At this time, equalization of the pressure between the wing upper and lower surfaces is undesirable. The illustrated embodiment further includes means for adjusting the doors so as to control the exhaust jet. This feature allows control of the inlet orifice during transition flight in the presence of unsymmetrical airflow conditions. Consequently, lift thrust can be vectored to permit control of flight attitude.

Another feature of the illustrated embodiment are guide vanes arranged at the area of communication between the air duct and the exhaust duct. In this way, intensive mixing of the secondary air with the primary exhaust jet can be achieved. Further, the possibility of reverse flow of engine gases through the air duct is prevented.

Other objects and advantages of the invention will become apparent with reference to the following description and accompanying drawings which show an illustrated embodiment of this invention.

DESCRIPTION OF THE PREFERRED EMBODIMENT

Figure 1:
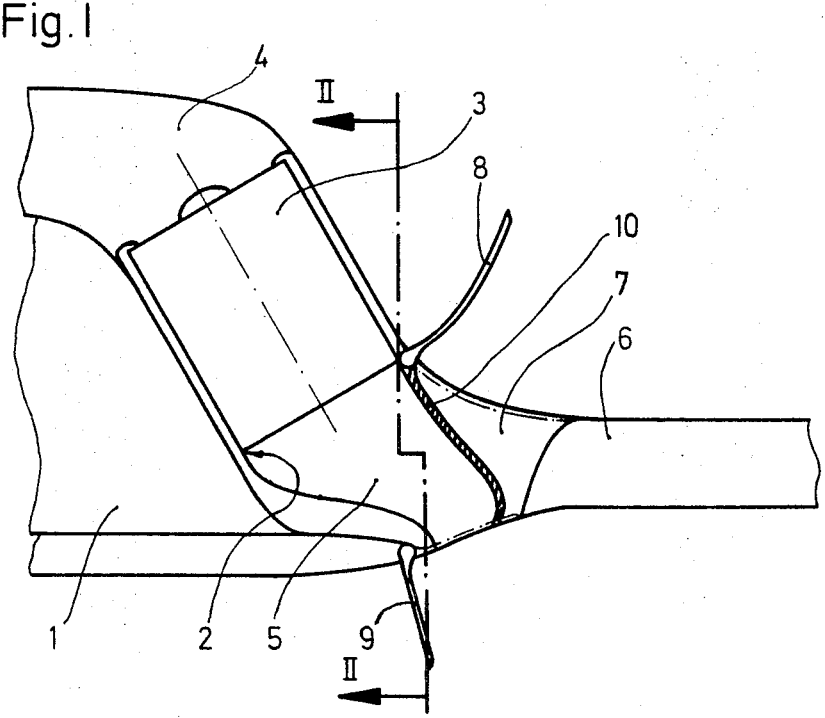
FIG. 1 is a partial cross-sectional view through an aircraft fuselage adjacent the lift engine illustrating certain features of this invention.

Due to the symmetry of the aircraft about the center longitudinal plane, only one-half of the fuselage cross section is illustrated in FIG. 1.

The aircraft fuselage 1 includes a duct 2 within which a lift engine 3 is accommodated. An intake duct 4, connected to the lift engine, terminates upon the dorsal surface of the fuselage. In the illustrated embodiment, there is a single intake duct for the two adjacently positioned lift engines which, as will be readily appreciated, could be arranged separately. The hot exhaust gases leaving the engine pass through an exhaust duct 5 to the ventral surface of the fuselage. The wing includes, at its base area, an air duct 7 defining intake and outlet orifices. The air duct 7 extends from the upper to the lower wing surface and joins or communicates with the exhaust duct 5 within the fuselage contour.

The air duct 7 at the inlet orifice is selectively obstructed by an inlet door 8, and the outlet orifice of the duct 7 is similarly selectively obstructed by an outlet door 9. In the illustrated embodiment, these doors pivot about an axis which is parallel to the aircraft longitudinal axis. Alternatively, the doors can be mounted so as to pivot about an axis which is normal to the longitudinal axis of the fuselage. In this manner, the doors serve to scoop air in accordance with well-known principles or for vectoring the lift engine thrust.

A guide vane 10 is provided in the area of the junction of the air duct 7 with the exhaust duct 5. This guide vane 10 serves to assure perfect conduction and mixing of the secondary air with the hot exhaust jet and to prevent reverse flow of hot engine gases through the air duct. If necessary, the guide vane may be rendered adjustable by any well-known means thereby permitting simple and efficient thrust vectoring.

Figure 2:
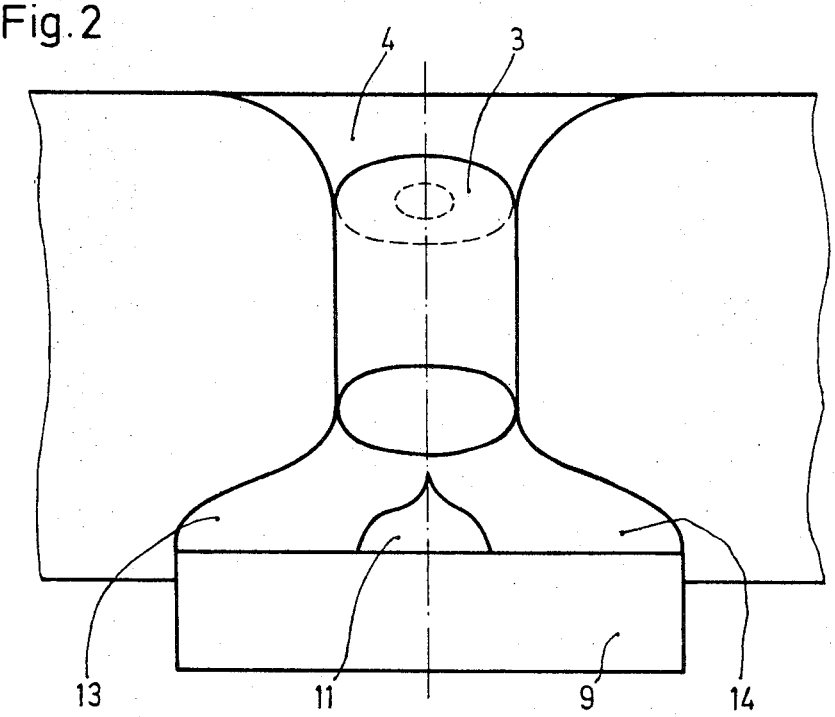
FIG. 2 is a sectional view of an aircraft fuselage along the lines II–II in FIG. 1.

FIG. 2 is a sectional view through the fuselage along the lines II–II of FIG. 1. The exhaust duct 5 is bifurcated defining two branches 13 and 14 by means of a jet divider 11. The divider 11 allows the wing spar to pass through the fuselage. As illustrated in FIG. 2, the exhaust duct 5 is shaped in the form of a flat jet nozzle.

Although only two specific embodiments of this invention have been shown and described herein, it will be understood that certain details of the construction shown may be altered without departing from the spirit and scope of this invention.

What I claim is:

1. A vertical takeoff and landing aircraft having a lift engine and nozzle therefor mounted within the fuselage adjacent the base of the wing and including an engine intake duct terminating at the dorsal surface of said fuselage, an engine exhaust duct terminating adjacent the ventral surface of the wing, a secondary air duct having an inlet orifice on the dorsal surface of said wing and extending through said wing to an outlet orifice on the ventral surface of said wing adjacent the base thereof, said air duct communicating with said exhaust duct at a point beyond the engine nozzle, and a guide vane positioned between the secondary duct and the exhaust duct at said point beyond said engine nozzle to control the mixing of exhaust gases and secondary air, and to prevent exhaust gas backflow through said secondary air duct.

2. An aircraft in accordance with claim 1 and including a flow divider in said exhaust duct and a wing spar extending through said flow divider in a direction substantially normal to said exhaust duct.

3. An aircraft in accordance with claim 1 which includes a selectively positionable inlet door mounted for the obstruction of the inlet orifice defined by said air duct, and a selectively positionable outlet door mounted for obstruction of the outlet orifice defined by said air duct.

4. An aircraft in accordance with claim 3, wherein the exhaust duct is shaped in the form of a flat jet nozzle.